Patented Sept. 18, 1951

2,568,685

UNITED STATES PATENT OFFICE 2,568,685

2-AMINO-4-HYDROXY-6-OMEGA-CARBOXY-TRIHYDROXY-PROPYLPTERIDINES

Harold G. Petering and John A. Schmitt, Kalamazoo, Mich., assignors to The Upjohn Company, Kalamazoo, Mich., a corporation of Michigan No Drawing. Application July 22, 1950, Serial No. 175,479

4 Claims. (Cl. 260—251.5)

This invention relates to 2-amino-4-hydroxy-6-omega - carboxytrihydroxy - propylpteridines having the formula:

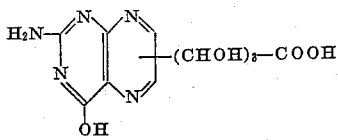

wherein the polyhydroxy carboxylic acid side chain is attached to the pteridine ring in the 6 or 7 position and to their preparation.

The products of this invention are brown to tan solids, soluble in aqueous alkalies and acids, sparingly soluble in water and relatively insoluble in most common organic solvents. They char and decompose without definite melting above 300 degrees centigrade and are best characterized by their ultra violet absorption spectra and the ratio of their extinction coefficients at the absorption maxima. The purity of the product (freedom from the isomeric compound) can be ascertained by the numerical value of the extinction coefficient $$E\frac{257\ mu}{370\ mu}$$

when determined in 0.1 normal alkali. When the $$E\frac{257\ mu}{370\ mu}$$

is between about 2.9 and 3.2 the product is predominately the 6-isomer with the value of 3.3 connoting analytically pure 6-isomer. When the numerical value of the $$E\frac{257\ mu}{370\ mu}$$

ratio is about 2.3–2.5 the product is predominately the 7-isomer with the value 2.3 denoting pure 7-isomer. These products are useful as intermediates in the preparation of other chemical compounds, for example oxidation with lead tetraacetate produces 2-amino-4-hydroxy-6-formyl pteridine, and as enzyme inhibitors and antiviral agents.

These new products can be prepared by reacting in acid solution 2,4,5-triamino-6-hydroxy pyrimidine and a 5-keto-gluconic acid, galacturonic or similar aldehyde and keto sugar acids, in the presence of hydrazine, a reaction which is accelerated by moderate heating, as on a steam bath. When the reaction is carried out at a pH of about 5, the product precipitates from the reaction mixture on cooling. The product thus obtained can be separated from other than isomeric impurities by washing with water and organic solvents. Separation of the 6- and 7-isomers is accomplished by extraction with warm dilute ammonium hydroxide solution at pH 8–8.5 or boiling dilute acetic acid solution having a pH of about 6.

Example 1

A dry mixture was prepared containing 0.5 gram of 2,4,5-triamino-6-hydroxy pyrimidine dihydrochloride, 0.4 gram of sodium bicarbonate and 1.04 grams of calcium 5-keto gluconate. Six milliliters of water was added whereupon carbon dioxide was evolved. After the evolution of carbon dioxide had ceased 0.25 milliliter of glacial acetic acid and 0.28 milliliter of 85 percent hydrazine hydrate solution were added to the reaction mixture. The mixture was placed on a steam bath where, as the temperature rose all of the solids went into solution resulting in a clear, light yellow solution. The reaction temperature was allowed to rise to about 90 degrees centigrade where it was maintained for about 45 minutes. During this time the light yellow color of the reaction mixture deepened, became orange and finally a reddish-brown. At the end of the heating period the reaction mixture was cooled and the precipitate which separated was collected, washed successively with water, methanol and ether and dried. There was obtained 0.46 gram of 2-amino-4-hydroxy-6-omega carboxy trihydroxypropylpteridine (seventy percent of theoretical) whose $$E\frac{257\ mu}{370\ mu}$$

ratio as determined in 0.1 normal sodium hydroxide solution was 3.2.

Example 2

When condensed in a manner similar to that of Example 1, 1.065 grams of 2,4,5-triamino-6-hydroxypteridine, 1.94 grams of D-galacturonic acid, 12 milliliters of water, 0.5 milliliter of acetic acid and 0.6 milliliter of 85 per cent hydrazine solution gave 1.12 grams of a mixture of 2-amino-4-hydroxy-6-omega carboxy trihydroxypropylpteridine and 2-amino-4-hydroxy-7-omega carboxy trihydroxypropylpteridine having an $$E\frac{257\ mu}{370\ mu}$$

as determined in 0.1 normal sodium hydroxide solution was 2.7.

Having thus described our invention, we claim:

1. A member of the group of compounds represented by the formula:

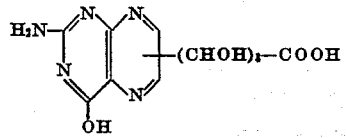

wherein the trihydroxypropylcarboxylic acid radical is attached to the pteridine ring in a member of the group consisting of the 6- and 7-positions.

2. A compound represented by the formula:

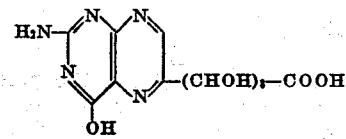

3. A compound represented by the formula:

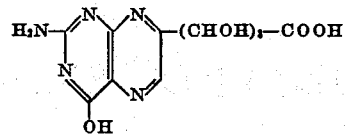

4. The process comprising heating in acid solution 2,4,5-triamino-6-hydroxypyrimidine and a member of the group consisting of 5-keto gluconic acid and galacturonic acid in the presence of hydrazine and isolating the 2-amino-4-hydroxy-6 (7)-omega carboxy trihydroxypropyl-pteridine from the reaction mixture.

HAROLD G. PETERING.
JOHN A. SCHMITT.

No references cited.